Patented June 6, 1933

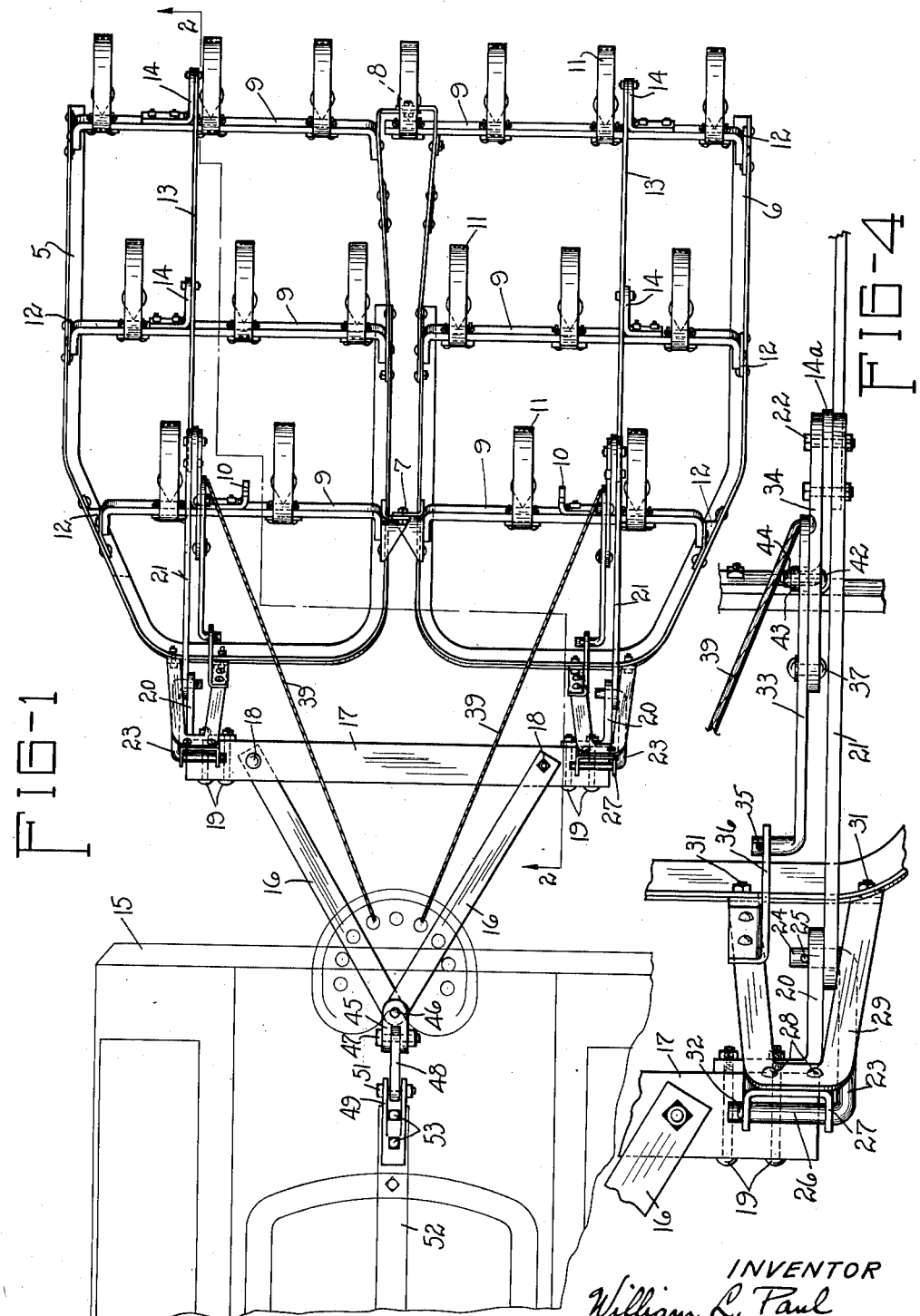

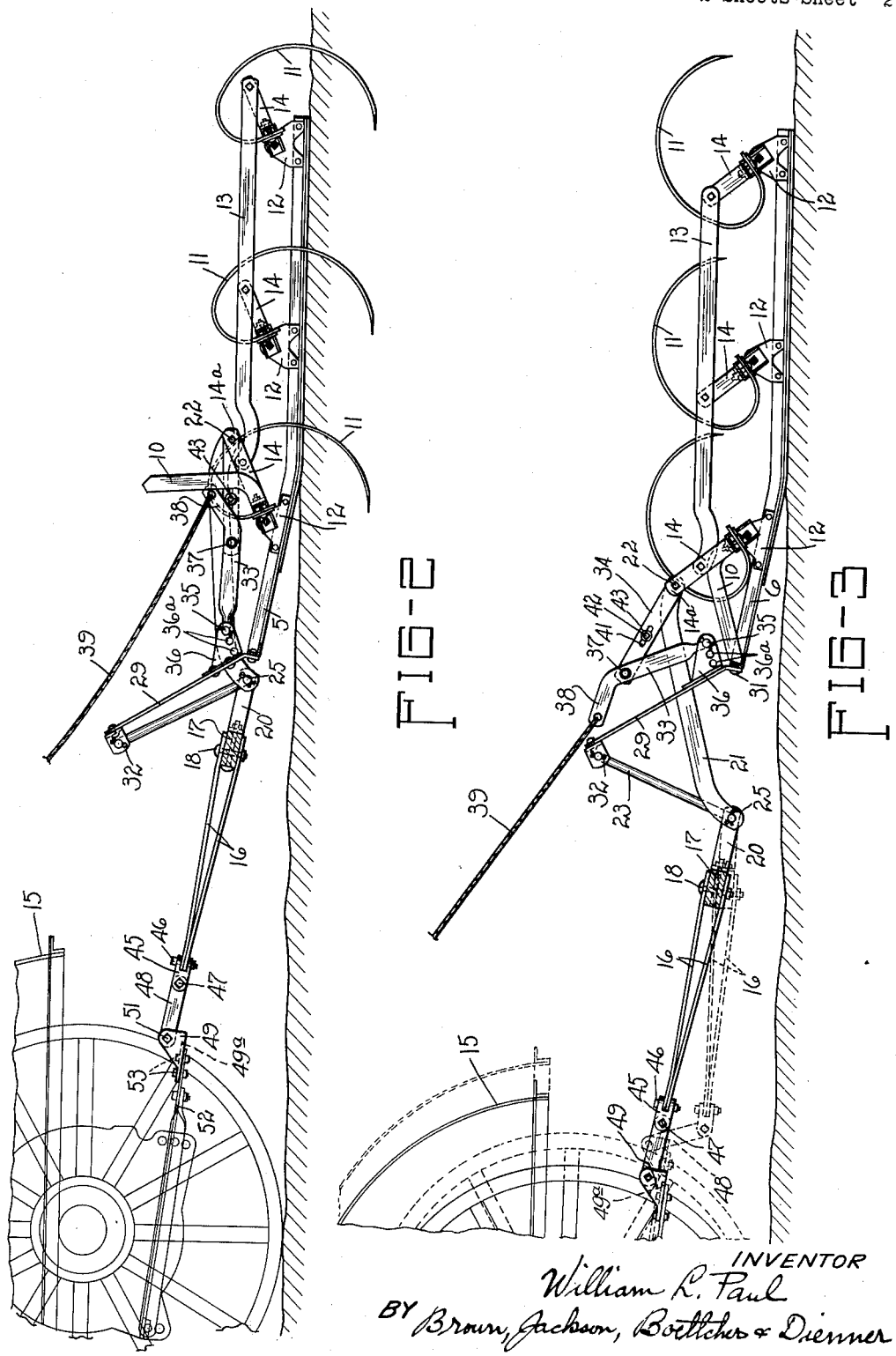

1,913,039

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

HARROW

Application filed March 20, 1930. Serial No. 437,307.

This invention relates to improvements in tillage implements of the type adapted to be drawn by a tractor or other propelling means, and more particularly to that class of implements generally known as spring tooth harrows.

The principal object of my invention is the provision of new and improved mechanism mounted on the harrow and connected with the draw bar of the tractor whereby the spring teeth or other earth working tools of the harrow may be moved from transport position to operating position by the backing of the tractor.

Another object of the invention is the provision of means operated by the backing of the tractor for automatically locking the teeth of the harrow in such operating position.

A further object of the invention is the provision of means whereby the teeth of the harrow may be changed from operating position to transport position by manually breaking the lock of said locking means, and by which forward movement of the harrow will operate to move the teeth to transport position.

A still further object of the invention is the provision of means whereby the teeth of the harrow will always be raised to the same height in transport position irrespective of the depth adjustment of the teeth when in operating position.

A still further object of the invention is the provision of means for automatically lowering the line of draft between the tractor and the harrow when the tractor is backed, so that upward movement of the rear end of the harrow relative to the forward end thereof will be prevented.

Other objects and advantageous features will appear from the following description of the preferred embodiment of my invention illustrated in the accompanying drawings and hereinafter described.

In the drawings:—

Fig. 1 is a top plan view of a two-section spring tooth harrow equipped with my improved mechanism, the teeth of the harrow being shown in operating position, and also illustrating, in light lines, a portion of the rear end of the drawing tractor to which the harrow is attached;

Fig. 2 is a sectional view taken on the plane of the line 2—2 of Fig. 1;

Fig. 3 is a view similar to Fig. 2, but showing the parts of the harrow when in transport position; and Fig. 4 is an enlarged top plan view of the shifting mechanism at the right hand side of the harrow as viewed from the front thereof.

While in the drawings I have shown my invention as applied to a two-section spring tooth harrow, it should be understood that my invention is not limited to use with a harrow of two sections, as it is adapted for use with one having any number of sections. It is also to be understood that certain features of my invention are adapted for use with other types of implements than harrows provided with spring teeth, and the appended claims are therefore to be construed accordingly.

Referring to the drawings, the harrow comprises two substantially parallel approximately U-shaped frame sections or members 5 and 6 formed of angle iron, which are flexibly connected together at their inner sides by suitable hinge members 7 and 8, as usual. Extending transversely of each of the frame sections 5, 6 are a plurality of tooth carrying bars 9 of any approved type, and on each of said bars are mounted a plurality of the usual spring teeth 11. In the construction illustrated each of the frame sections is provided with three tooth carrying bars, but it is to be understood that any desired number may be employed. As is typical in this class of implements, said tooth carrying bars are pivotally mounted on the frame sections by means of suitable brackets 12, so as to have a rocking movement with respect to said frame to raise and lower the harrow teeth. By rocking the bars 9 either forwardly or rearwardly, the teeth 11 carried by these bars are rocked to their transport position as shown in Fig. 3, or to their working position as shown in Fig. 2. As best shown in Fig. 2, the front tooth carrying bar of each harrow section is provided with an arm 10, which arms are bolted to the bars and extend upwardly therefrom when the teeth 11 are in operating position as shown in said figure. The purpose of these arms 10 will be hereinafter described.

The various tooth carrying bars 9 of each frame section are operatively connected to a longitudinally extending shifting bar or lever 13 by suitable standards 14 extending upwardly from said bars, said standards being rigidly connected to the tooth carrying bars and pivotally connected to the shifting bar or lever, as is conventional in machines of this type.

The drawing tractor is indicated as a whole by the reference numeral 15, and draft is applied to the harrow from the tractor through a suitable hitch member in the form of a draft frame comprising forwardly converging bars 16, which at their forward ends are suitably pivotally connected together and to the draw bar of the tractor as hereinafter described, and a transversely extending beam 17 to which the rear ends of the bars 16 are suitably connected by bolts 18, as best shown in Fig. 1. Fixed to each end of the beam 17 by means of bolts 19 is a rearwardly extending arm 20, and pivotally connected to each of said arms is a draft member or link 21 which extends rearwardly from its point of connection with the arm 20 and at its rear end is pivotally connected by a pivot bolt 22 to the extended end 14ª of the arm 14 on the front tooth carrying bar 9, as best shown in Figs. 2, 3 and 4.

The opposite ends of the transverse beam 17 of the draft frame are supported from the harrow frame, and as the construction at both ends is the same, I shall describe only one herein. This construction is best shown in Fig. 4, and as therein illustrated I provide a swinging suspension link or bail 23, the lower turned end 24 of which extends through the rear end portion of the arm 20 and through the forward end portion of the draft member 21, forming the pivotal connection between these two members. This lower end of the bail is held in position by a cotter pin 25 or other suitable means, as shown.

The upper turned end 26 of the bail link 23 is suitably supported in bearing openings in the spaced arms of a U-shaped bracket 27, rigidly fixed by means of bolts 28 to the upper end of a supporting member 29 which is approximately in the form of an inverted U, as shown in Fig. 4. This supporting member has its lower end portions bolted to the front end portion of the frame member 6 of the harrow by means of bolts 31, the member 29 extending upwardly and forwardly from the front of the harrow frame, as best shown in Figs. 2 and 3. The upper end 26 of the bail 23 is held in position in the bracket 27 by a cotter pin 32 or other suitable means as shown. It will thus be seen that the rear end of the draft frame comprising the members 16 and 17 is swingably supported from the forward ends of the harrow sections 5 and 6.

Draft is applied to the harrow frame from the draft members 21 thereof through a toggle mechanism comprising links 33 and 34 associated with each of the members 21. The link 33 is provided at one end with a short laterally extending pivot arm or lug 35, best shown in Fig. 4, by which it is pivotally connected to a bracket 36 rigidly fixed to and extending rearwardly from the lower end of the inner arm of the U-shaped bracket 29. The link 33 near its opposite end is pivotally connected at 37 to the forward end of the link 34. The rear end of the link 34 is pivotally connected to the draft member 21 and to the extended upper end 14ª of the forward arm 14 (see Figs. 2 and 3) by the pivot bolt 22, which, as before described, pivotally connects the draft member 21 and the arm 14 together. The link 33 adjacent to the pivot point 37 is provided with an offset arm 38, to the outer end of which the rear end of a tripping rope or cable 39 is connected, the forward end of said rope extending to a point adjacent the driver's seat on the tractor. At this point it may be well to mention that the bracket 36 is provided with a pluarlity of holes 36ª for receiving the arm or lug 35 of the lever 33, and by transferring said lug to one or the other of said holes the harrow teeth will be set to operate at a different depth. In Fig. 2 the harrow is shown with the teeth in position to operate at the greatest depth, and the lug is positioned in the rearmost of the three holes there illustrated. In order to adjust the teeth to operate at a lesser depth, therefore, the lug 35 may be transferred to one of the other two holes 36ª as desired, all of which will be readily understood. It might also be well to mention here that if it were considered necessary or desirable to have lever mechanism for adjusting the depth of penetration of the teeth 11, that could easily be provided for by pivoting the lug or arm 35 to a detent lever suitably pivoted to the frame of the harrow with means such as a notched sector cooperating with the lever to hold the lever in any desired one of a plurality of adjusted positions.

The link 34 is provided near its center with a slot 41 in which is carried a bolt 42. Mounted on this bolt on the inner side of the link 34, as seen in Fig. 4, is a short sleeve 43, said sleeve being clamped against the inner face of the link by means of a nut 44 mounted on said bolt. This sleeve 43 forms a stop for limiting the closed position of the toggle, as clearly shown in Fig. 2, for when the toggle is in such closed or locked position the offset arm 38 of the link 33 rests on said sleeve 43 and prevents further downward movement of the parts. The position of this stop sleeve 43 may be adjusted by sliding the bolt 42 in one direction or the other in the slot 41, and this adjustment is provided for a purpose to be hereinafter described.

The forward ends of the draft members 16 are pivotally connected together and to the rear end of a clevis 45 by means of a pin or pivot bolt 46, and the forward end of the clevis 45 is pivotally connected by means of a pivot bolt 47 with the rear end of a draft link 48, the forward end of which is pivotally connected with the rear end of a clevis bracket 49 by means of a pivot bolt 51. The forward end of the clevis bracket 49 is rigidly secured to the draw bar 52 of the tractor by means of bolts 53. This connecting mechanism between the draft members 16 of the harrow and the draw bar of the tractor is best shown in Figs. 1 and 3, and the purpose thereof will hereinafter appear.

The operation of my improved mechanism is as follows: When the harrow is in operating position as shown in Fig. 2, the offset arm 38 of the link 33 rests on the sleeve 43 as before described, and it will be seen that the pivot points 35, 37 and 22 are on nearly a straight line, with the pivot point 37 slightly below the plane of a line drawn through the pivot points 35 and 22. When the draft member 21 is placed under tension by forward pull of the tractor the toggle links 33 and 34 are placed in compression, and the force thus created tends to move the pivot point 37 downwardly, but this downward movement beyond a predetermined point is prevented by the offset arm 38 of the link 33 coming in contact with the sleeve 43 and being held thereby against further downward movement. As a result, forward thrust is applied to the harrow frame through the bracket 36 and link 33 acting in compression, and as the pivot point 37 is below the plane of a line drawn between the pivot points 35 and 22 as above described a past center lock is created, which lock can only be released by forcing the pivot point 37 upwardly to a point above the plane of said line, which is accomplished as hereinafter described. The normal position of the pivot point 37, when the toggle links 33 and 34 are under compression, may be adjusted relative to the pivot points 35 and 22 by adjusting the position of the sleeve 43, and this is accomplished by moving the bolt 42 on which said sleeve is mounted in one direction or the other in the slot 41. Sliding the bolt 42 rearwardly in the slot lowers the normal position of the pivot point 37 with respect to the pivot points 35 and 22, and sliding it forwardly raises the normal position of the pivot point 37 with respect to said pivot points 35 and 22.

When it is desired to bring the harrow to transport position from operating position, the operator on the tractor pulls forward on the tripping ropes 39, thereby breaking the past center lock formed by the toggle links at each side of the harrow, and as the tractor moves forward the draft members or links 21 will be pulled forwardly, and by reason of the pivotal connection of their rear ends with the extended upper ends 14ª of the arms 14 on the front tooth carrying bars 9 will cause said bars to rock forwardly. This forward movement of said bars will continue until the outer ends of the arms 10 secured to said bars are swung forwardly and downwardly and brought into a position so that their upper ends bear against the inner corner of the front transverse portion of the frame members 5 and 6, as best shown in Fig. 3, which will prevent further rocking movement of the bars 9, whereupon the harrow is moved along with its teeth 11 in transport position. The arms 10 thus act as stop means to prevent rocking movement of the bars 9 beyond a predetermined point in the raising of said bars to transport position.

When the harrow is being pulled by the tractor with the teeth in transport position (or in operating position) the link 48 will occupy the position shown in full lines in Figs. 2 and 3, but when the tractor is backed to place the teeth in operating position such backward movement of the tractor will swing the rear end of the link 48 downwardly, said link swinging on the pivot pin 51, thus causing the draft members 16 to drop down to the position shown in dotted lines in Fig. 3, at which time the link 48 comes in contact with the rear end of the center section 49a of the bracket 49 which forms a stop for preventing further downward movement of said link. This is necessarily so because when the tractor is stopped preparatory to backing it, the drawing tension created on the linkage defined by the members 16, 45, 48 and 49 will be relaxed and the weight of these parts between the pivot points 25 and 51 will tend to move said parts in a downward direction, and upon the backing of the tractor such downward movement will continue until the parts assume the positions shown in dotted lines in Fig. 3. Therefore, by means of the mechanism comprising the members 16, 45, 48 and 49 means have been provided for automatically lowering the draft line between the tractor and the harrow when the tractor is backed. This is an important feature of my invention as it has been found that if the draft line is not lowered when the tractor is backed there is a tendency for the rear end of the harrow to tip up relative to the forward end thereof. This tendency to tip up, however, has been overcome by the present arrangement of connecting means above described.

Continued backing of the tractor with the member 16 in its dotted line or lowered position will then swing the standards 14 in a clockwise direction as viewed in Fig. 3, thus moving the toggle links 33 and 34 to their extended position where the pivot points 35, 37 and 22 are in alignment. In this position, however, the force of gravity acting on the links is effective to swing them downwardly so that the pivot point 37 moves below the line of the pivots 35 and 22 and the offset arm 38 will contact with the sleeve 43, thus establishing the toggle or past center lock so that forward pull on the member 16 will now be effective to draw the implement with the teeth 11 in operating position.

I claim:—

1. The combination with an implement including a hitch member, of earth working tools carried thereby, and means pivotally connected with the forward portion of the implement and with said hitch member and controlled by the backing of the implement for lowering said earth working tools from transport position to operating position.

2. The combination with an implement, of earth working tools carried thereby, a depending link pivoted to the implement, and means carried by said depending link and controlled by the backing of the implement for lowering said earth working tools from transport position to operating position.

3. The combination with an implement, of earth working tools rotatably mounted on said implement, and means pivotally suspended from the implement and controlled by the backing of the implement for rotating said earth working tools from transport position to operating position.

4. The combination with an implement, of earth working tools carried thereby, a member pivotally mounted on the forward portion of the implement and controlled by the backing of the implement for lowering said earth working tools from transport position to operating position, and means connected with the rear end of said member operable automatically to lock said earth working tools in the latter position.

5. The combination with an implement, of earth working tools carried thereby, means controlled by the backing of the implement for lowering said earth working tools from transport position to operating position, and toggle link mechanism for automatically locking said earth working tools in operating position when they are moved to such position.

6. In a tractor drawn implement, the combination with said implement, of earth working tools mounted on said implement, and a draft member pivotally suspended from the implement and connected with said earth working tools and with the tractor and operative upon backing of the tractor to rotate said earth working tools from transport position to operating position.

7. In a tractor drawn implement, the combination with said implement, of earth working tools mounted on said implement, a draft member connected with said earth working tools and with the tractor and operative upon backing of the tractor to rotate said earth working tools from transport position to operating position, and means controlled by rearward movement of said draft means for locking said earth working tools in operating position.

8. In a tractor drawn implement, the combination with said implement, of earth working tools rotatably mounted on said implement, a draft member connected with said earth working tools and with the tractor and operative upon backing of the tractor to rotate said earth working tools from transport to operating position, and toggle link mechanism connected with said draft member and with the implement for locking said earth working tools in operating position.

9. In a tractor drawn implement, the combination with said implement, of earth working tools rotatably mounted on said implement, a draft member connected with said earth working tools and with the tractor and operative upon backing of the tractor to rotate said earth working tools from transport to operating position, toggle link mechanism connected with said draft member and with the implement for locking said earth working tools in operating position, and means operative from the tractor for breaking said toggle lock to permit rotation of said earth working tools from operating position to transport position upon forward movement of the tractor.

10. In a tractor drawn implement, the combination with said implement, of earth working tools carried thereby, means mounted on the implement and controlled by the backing of the tractor for moving said earth working tools from transport position to operating position, means for automatically locking said earth working tools in operating position, said means comprising a pair of toggle links, and means for preventing movement of said toggle links in one direction beyond a predetermined point.

11. In a tractor drawn implement, the combination with said implement, of earth working tools carried thereby, means mounted on the implement and controlled by the backing of the tractor for moving said earth working tools from transport position to operating position, means for automatically locking said earth working tools in operating position, said means comprising a pair of toggle links, and means mounted on one of said links and cooperating with the other link for preventing movement of said toggle links in one direction beyond a predetermined point.

12. In a tractor drawn implement comprising a frame, the combination with said implement, of earth working tools carried thereby, depth adjusting means for said tools, means for raising said earth working tools from operating position to transport position by forward movement of the tractor, and stop means associated with said raising means and adapted to contact with said frame for limiting the upward movement of said tools in the raising operation.

13. In a tractor drawn implement, the combination with said implement, of earth working tools carried thereby, depth adjusting means for said tools, and means actuated by relative movement between the implement and the tractor for shifting said tools between operating and transport positions, said latter means being operative to raise said earth working tools always to the same height irrespective of the adjustment of said depth adjusting means.

14. In a tractor drawn implement, the combination with said implement, of earth working tools rotatably mounted on said implement, means controlled by the backing of the tractor for rotating said earth working tools from transport position to operating position, draft means connecting the implement with the tractor and means for automatically lowering the line of draft between the tractor and the harrow for preventing upward movement of the rear end of the implement relative to the forward end thereof when the tractor is backed.

15. In a tractor drawn implement, the combination with said implement, of means connecting the implement with the tractor for preventing upward movement of the rear end of the implement relative to the forward end thereof when the tractor is backed, said means including a vertically swinging link.

16. In a tractor drawn implement comprising a frame, the combination with said implement, of tooth carrying bars rotatably mounted on said frame, earth working teeth carried by said bars, means for swinging said bars to move said earth working teeth from operating position to transport position by forward movement of the harrow, and means connected with one of said bars and movable into contact with said frame for preventing movement of said bars beyond a predetermined point.

17. In a tractor drawn implement, the combination with said implement, of earth working tools carried thereby, a draft member connected with said earth working tools and with the tractor and operative upon backing of the tractor to rotate said earth working tools from transport to operating position, toggle link mechanism connected with said draft member and with the implement for locking said earth working tools in operating position, and means mounted on the implement and pivotally connected with said toggle link mechanism for regulating the depth adjustment of said earth working tools when they are moved to operating position.

18. In a tractor drawn implement, the combination with said implement, of earth working tools carried thereby, a draft member connected at its rear end with said earth working tools and operative upon backing of the tractor to move said earth working tools from transport position to operating position, a draft frame at the forward end of said implement, means pivotally connecting said draft member with said draft frame, said means comprising a swinging bail pivotally connected at its upper end with said implement, the lower end of said bail forming the pivotal connection between said draft member and said draft frame, and means controlled by rearward movement of said draft member for locking said earth working tools in operating position.

19. In a tractor drawn implement, the combination with said implement, of earth working tools carried thereby, a draft member connected at its rear end with said earth working tools and operative upon backing of the tractor to move said earth working tools from transport position to operating position, a draft frame at the forward end of said implement, means pivotally connecting said draft member with said draft frame, said means comprising a member extending upwardly from said implement, a swinging bail pivotally suspended from said last-named member to swing fore and aft, the lower end of said bail forming a pivotal connection between said draft member and said draft frame, and means controlled by rearward movement of said draft member for locking said earth working tools in operating position.

20. In a tractor propelled implement, the combination with said implement, of earth working means carried thereby, draft means, a swinging suspension link on the forward end of the implement for supporting the rear end of said draft means, and means connecting said draft means with said earth working means and drawn forwardly by forward draft of the tractor to change the position of said earth working means.

21. The combination with an implement, of earth working tools carried thereby, and means comprising a pivotally suspended member controlled by the backing of the implement for lowering said earth working tools from transport position to operating position, said means operating automatically to lock said earth working tools in the latter position.

22. The combination with an implement, of earth working tools mounted on said implement, and a draft member pivotally mounted on said implement and connected with said earth working tools operative upon backing of the implement to rotate said earth working tools from transport position to operating position.

23. The combination with an implement, of earth working tools rotatably mounted on said implement, a draft member mounted on said implement and connected with said earth working tools operative upon backing of the implement to rotate said earth working tools from transport to operating position, and toggle link mechanism connected with said draft member and with the implement for locking said earth working tools in operating position.

24. The combination with an implement, of earth working tools rotatably mounted on said implement, a draft member mounted on said implement and connected with said earth working tools operative upon backing of the implement to rotate said earth working tools from transport to operating position, toggle link mechanism connected with said draft member and with the implement for locking said earth working tools in operating position, and means for breaking said toggle lock to permit rotation of said earth working tools from operating position to transport position upon forward movement of said implement.

25. The combination with an implement, of earth working tools carried thereby, means for moving said tools from non-working position to working position, and separate means connected with said first mentioned means and with the implement and actuated by the force of gravity for locking said tools in one of said positions when that position is reached.

26. The combination with an implement, of earth working tools carried thereby, means for moving said tools from non-working position to working position, and separate fore and aft movable means actuated by the force of gravity for locking said tools in one of said positions when that position is reached, said locking means being adapted to be manually unlocked to permit the tools to be moved to their other position.

27. The combination with an implement, of earth working tools carried thereby, means for moving said tools from non-working position to working position, and a toggle link locking mechanism actuated by the force of gravity for locking said tools in one of said positions.

In witness whereof, I hereunto subscribe my name this 3rd day of March, 1930.

WILLIAM L. PAUL.